COMMUNICATION SYSTEM EMPLOYING PULSE CODE MODULATION
Original Filed May 10, 1945 8 Sheets-Sheet 1
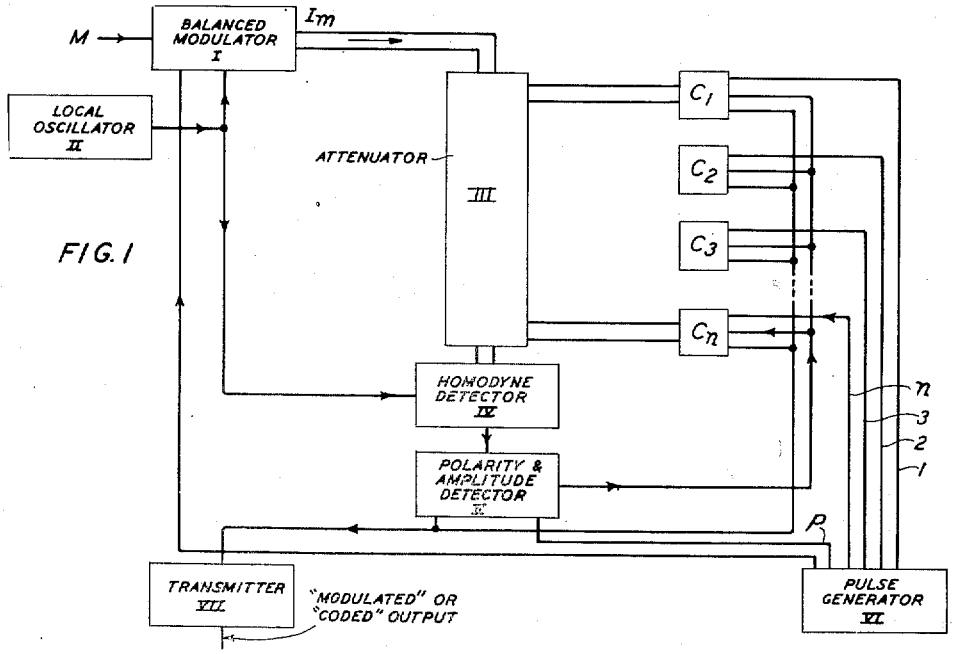
FIG. 1
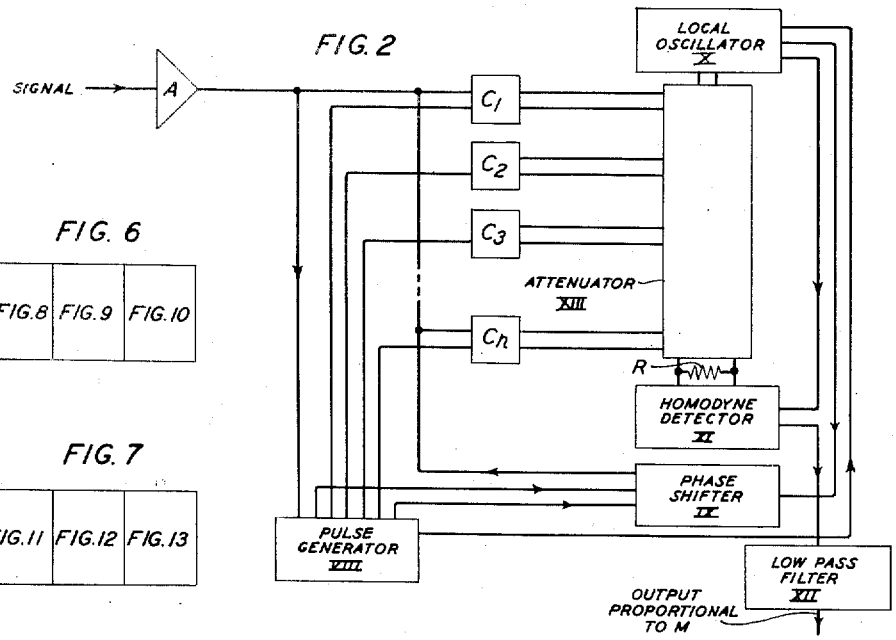
FIG. 2
FIG. 6
| | | |
|---|---|---|
| FIG. 8 | FIG. 9 | FIG. 10 |
FIG. 7
| | | |
|---|---|---|
| FIG. 11 | FIG. 12 | FIG. 13 |
INVENTOR
J. R. PIERCE
BY William F. Simpson
ATTORNEY

COMMUNICATION SYSTEM EMPLOYING PULSE CODE MODULATION

Original Filed May 10, 1945 8 Sheets-Sheet 2

INVENTOR
J. R. PIERCE
BY William F. Simpson.

ATTORNEY

COMMUNICATION SYSTEM EMPLOYING PULSE CODE MODULATION
Original Filed May 10, 1945 8 Sheets-Sheet 3
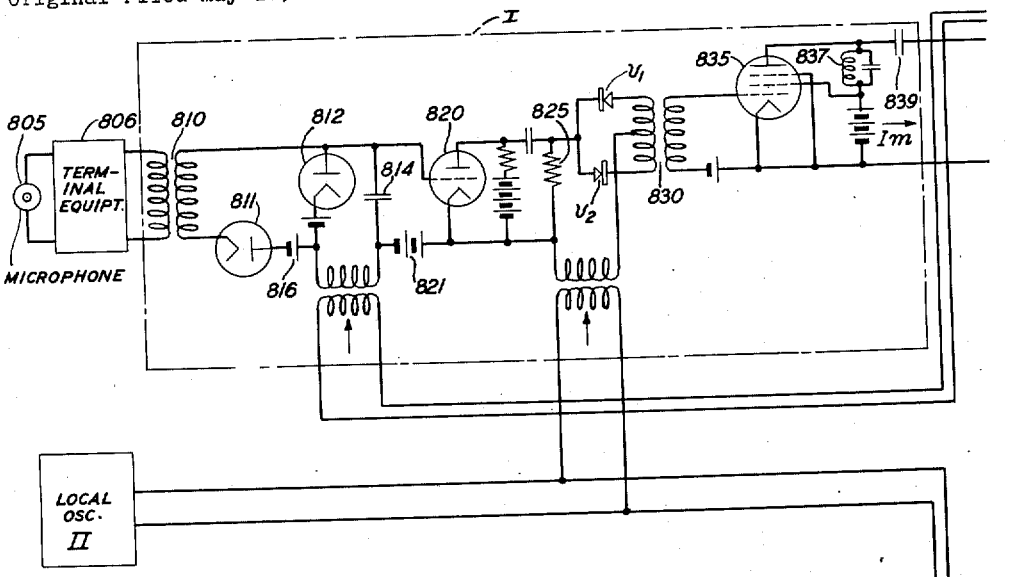
FIG. 8
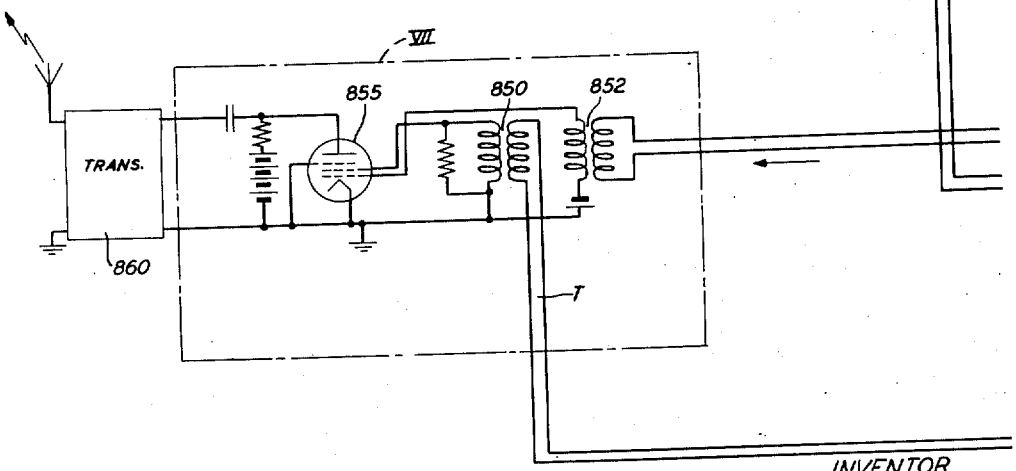
INVENTOR
J. R. PIERCE
BY William F. Simpson.
ATTORNEY

COMMUNICATION SYSTEM EMPLOYING PULSE CODE MODULATION

Original Filed May 10, 1945 8 Sheets-Sheet 4

INVENTOR
J. R. PIERCE
BY William F. Simpson.
ATTORNEY

COMMUNICATION SYSTEM EMPLOYING PULSE CODE MODULATION

Original Filed May 10, 1945 8 Sheets-Sheet 5

INVENTOR
J. R. PIERCE
BY William F. Simpson
ATTORNEY

COMMUNICATION SYSTEM EMPLOYING PULSE CODE MODULATION

Original Filed May 10, 1945 8 Sheets-Sheet 6

INVENTOR
J. R. PIERCE
BY William F. Simpson.
ATTORNEY

COMMUNICATION SYSTEM EMPLOYING PULSE CODE MODULATION
Original Filed May 10, 1945 8 Sheets-Sheet 7
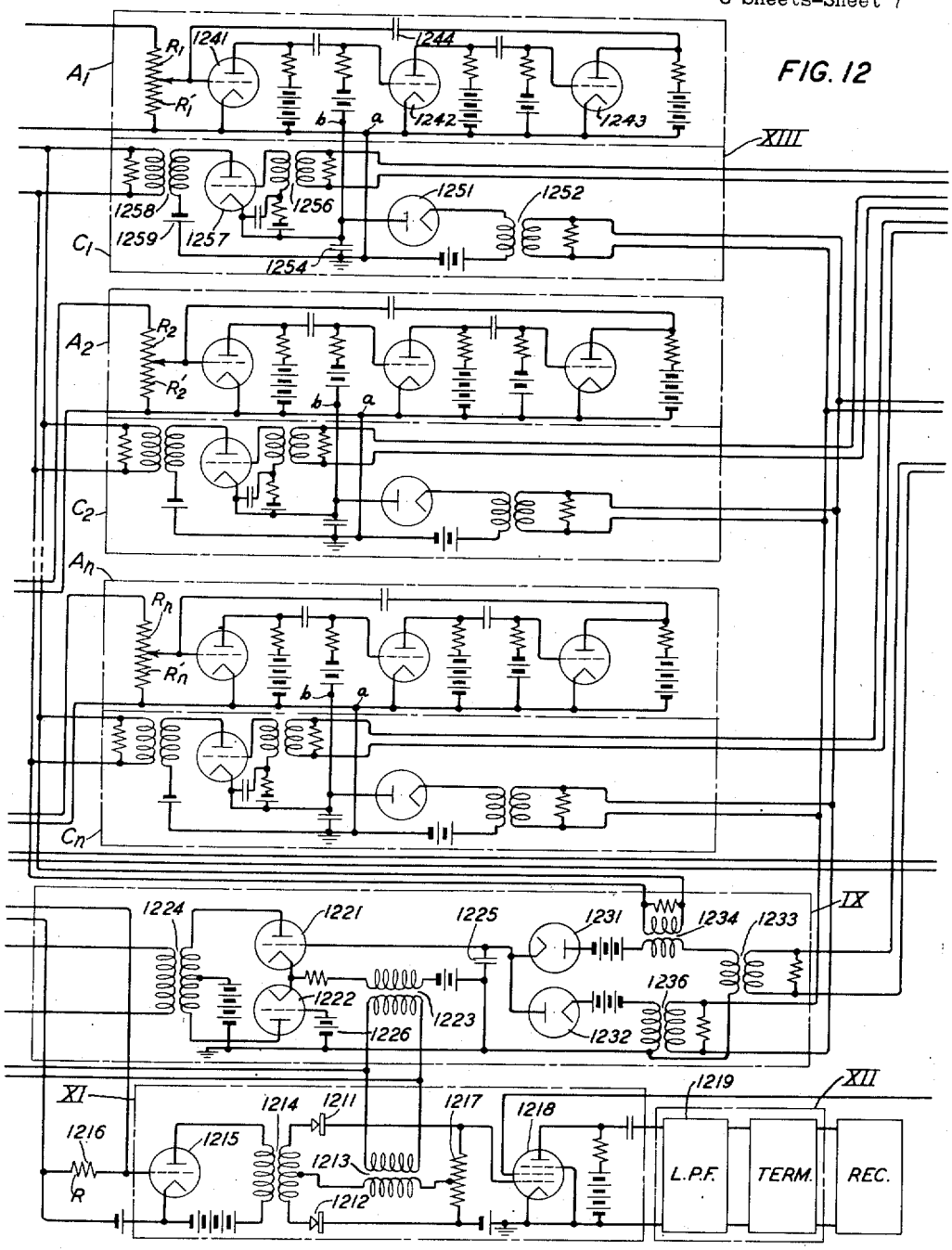
INVENTOR
J. R. PIERCE
BY William F. Simpson.
ATTORNEY

COMMUNICATION SYSTEM EMPLOYING PULSE CODE MODULATION

Original Filed May 10, 1945 8 Sheets-Sheet 8

INVENTOR
J. R. PIERCE
BY William F. Simpson
ATTORNEY

Reissued Nov. 11, 1952

Re. 23,579

UNITED STATES PATENT OFFICE 23,579

COMMUNICATION SYSTEM EMPLOYING PULSE CODE MODULATION

John R. Pierce, Berkeley Heights, N. J., assignor to Bell Telephone Laboratories, Incorporated, New York, N. Y., a corporation of New York Original No. 2,538,266, dated January 16, 1951, Serial No. 592,961, May 10, 1945. Application for reissue April 12, 1951, Serial No. 220,558

30 Claims. (Cl. 179—15.6)

Figure 3:
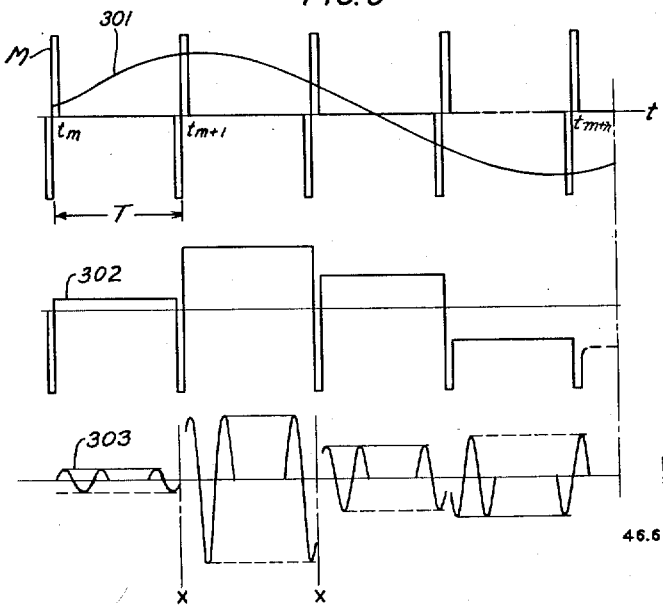

Matter enclosed in heavy brackets [ ] appears in the original patent but forms no part of this reissue specification; matter printed in italics indicates the additions made by reissue.

This invention relates to communication systems for the transmission of complex wave forms of the type encountered in speech, music, sound, mechanical vibrations and picture transmission [bymeans] *by means* of code groups of a uniform number of signal impulses of a plurality of different types or signaling conditions transmitted at high speed.

The object of the present invention is to provide a communication system capable of transmitting and reproducing with high fidelity a complex wave form over an electrical transmission path in such a manner that the signal-to-noise ratio of the received signal is materially improved, the frequency band width required for the transmission of the signals being held at the same time to a minimum.

Another object of this invention is to provide improved and simplified methods and apparatus capable of transmitting and receiving signal impulses over a noisy channel and deriving therefrom signals having a high signal-to-noise ratio.

More specifically, it is an object of the present invention to provide methods of and circuits and apparatus for transmitting in succession a group of pulses in sequence representative of the amplitude of a complex wave at successive instants of time.

It is a further object of the present invention to provide improved apparatus for determining the code to be transmitted to represent each of a large number of different amplitudes without the use of complicated counting circuits, arrangements and equipment.

Still another object of the present invention is to transform a series of pulses representing the amplitude of a complex wave at a given instant of time into a single pulse having an amplitude which is a function of the amplitude of the original complex wave at the given instant.

Another object of this invention is to recombine a succession of such single pulses of varying amplitude in a manner to reconstruct a wave form of substantially the same shape as the wave form to be transmitted.

A feature of the invention relates to a sampling apparatus for sampling a complex wave at frequent intervals of time.

Another feature of the present invention relates to methods and apparatus for determining the magnitude of an electrical quantity and transmitting a series of pulses representative of said magnitude.

Another feature of the invention relates to methods and apparatus for building up an electrical quantity which is simply related to and a measure of the amplitude of a sample of a complex wave at a given instant. This quantity may take on the nature of an attenuation, conveniently expressed in decibels.

Still another feature of this invention relates to methods and means for building up [of] this electrical quantity step by step by a multiplicative or a divisive process i. e., on a non-linear basis to a total which is a function of to the amplitude of a complex wave.

Another feature of the invention relates to the use of attenuation to be so built up by an additive or subtractive process on a decibel basis to the total required thus obtaining the equivalent of a compression of the signal.

Another feature relates to the transmission of information, in the form of a code, regarding each attenuation introduced or withdrawn.

Still another feature relates to methods and means for receiving such transmitted information, decoding and translating it to finally yield a wave form which reproduces with high fidelity the original complex wave.

Other features of the invention relate to synchronizing and coordinating the various circuits and equipment at the transmitting terminal with each other and with the circuits and equipment of the receiving end so as to secure proper operation of the entire system.

Briefly, in accordance with the present invention, equipment is provided for generating a control pulse or a group of pulses of predetermined time relation one with another. These control pulses are employed to control a code element timing circuit which circuit in turn generates a series of very short pulses some of which are positive and some negative and some a combination of the two.

Apparatus is also provided for sampling or deriving an electrical quantity which is a function of the amplitude of a complex wave to be transmitted, this sampling means being under control of the control pulse generator. For each of the control pulses a code element timing circuit generates a series of code element timing pulses and these in combination with the sampling means derive an electrical quantity having a magnitude related to the magnitude of the complex wave at the time of the control pulse.

This electrical quantity, as illustrated herein, takes on the character of an attenuation which may be varied step by step, operating on the complex wave sample and being controlled by a residual from the sample after attenuation to determine the next step of variation in the attenuation. More specifically, the electrical quantity is in the nature of a plurality of resistances of different magnitudes which may be added to or omitted from the circuit in such combinations as to yield an attenuation related to the magnitude of the complex wave at the time of the control pulse. The amount of attenuation is tested from instant to instant as a smaller and smaller change is made in its value to see whether, within a certain reference limit and at each step, it is in excess of or is below the desired magnitude. If, for example, the attenuation after any change is such that when operating in connection with the complex wave sample the attenuation is in excess of the desired value, the last previous change is removed, but if the total attenuation is below the desired value, the last change is left in and the next smaller change is introduced for trial. In the specific illustration of my invention given herewith this plan is followed and if the magnitude of the attenuation due to the last addition leaves a residual of the complex wave less than an arbitrary reference level, then the last added element of attenuation is removed and an "on" signal is transmitted. If the addition still leaves a residual above the reference level, then it remains in and information to this effect is passed to the remote point by the absence of a transmitted signal, i. e., an "off" signal; the identification of the information being specified by the time at which the informational pulse is transmitted or not transmitted.

This form of comparing the sample with the attenuation is then carried on step by step [to] as far [a point] as may be desired and in any case to an extent so that the granularity of the signal finally reproduced at a receiving point will be within the limits of fidelity contemplated for the system.

While thus setting up a code of "on" and "off" pulses completely characterizing the amplitude of each sample of the complex wave, this code of pulses is transmitted. Since the amplitude of the sample is completely defined by the code combination of pulses the receiving equipment is required only to determine, in the first instance, the character of each pulse i. e., whether it is an "on" or an "off" pulse. Consequently as long as the received pulses are sufficiently above the noise level to permit their character to be accurately determined by the receiving equipment the origin and nature of the noise as well as the origin and nature of the amplitude and other distortions of the transmission path including repeaters, if any, are of little or no effect because such noise and distortions do not change the code combinations.

In addition at the receiving station a control pulse generator, *a* code element timing generator and a system of attenuations to be introduced or not introduced, all analogous to those of the transmitting station, are provided. In addition, decoding apparatus is provided in which the received pulses are employed to produce an electrical quantity having a polarity and magnitude similar to those of the complex wave sample of the transmission end of the system and thus the complex wave is reconstructed from a succession of such reproduced wave samples.

Figure 4:
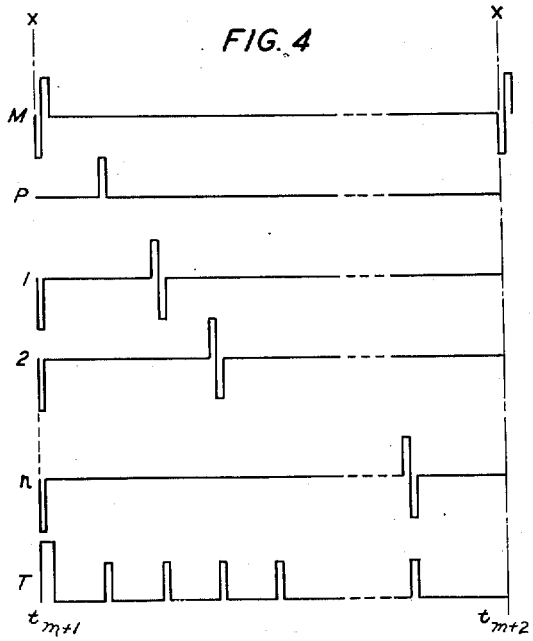
Figure 5:
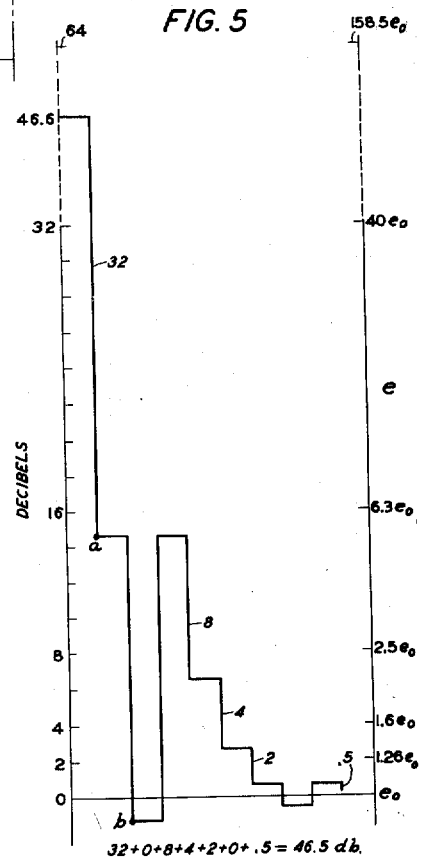
Figure 9:
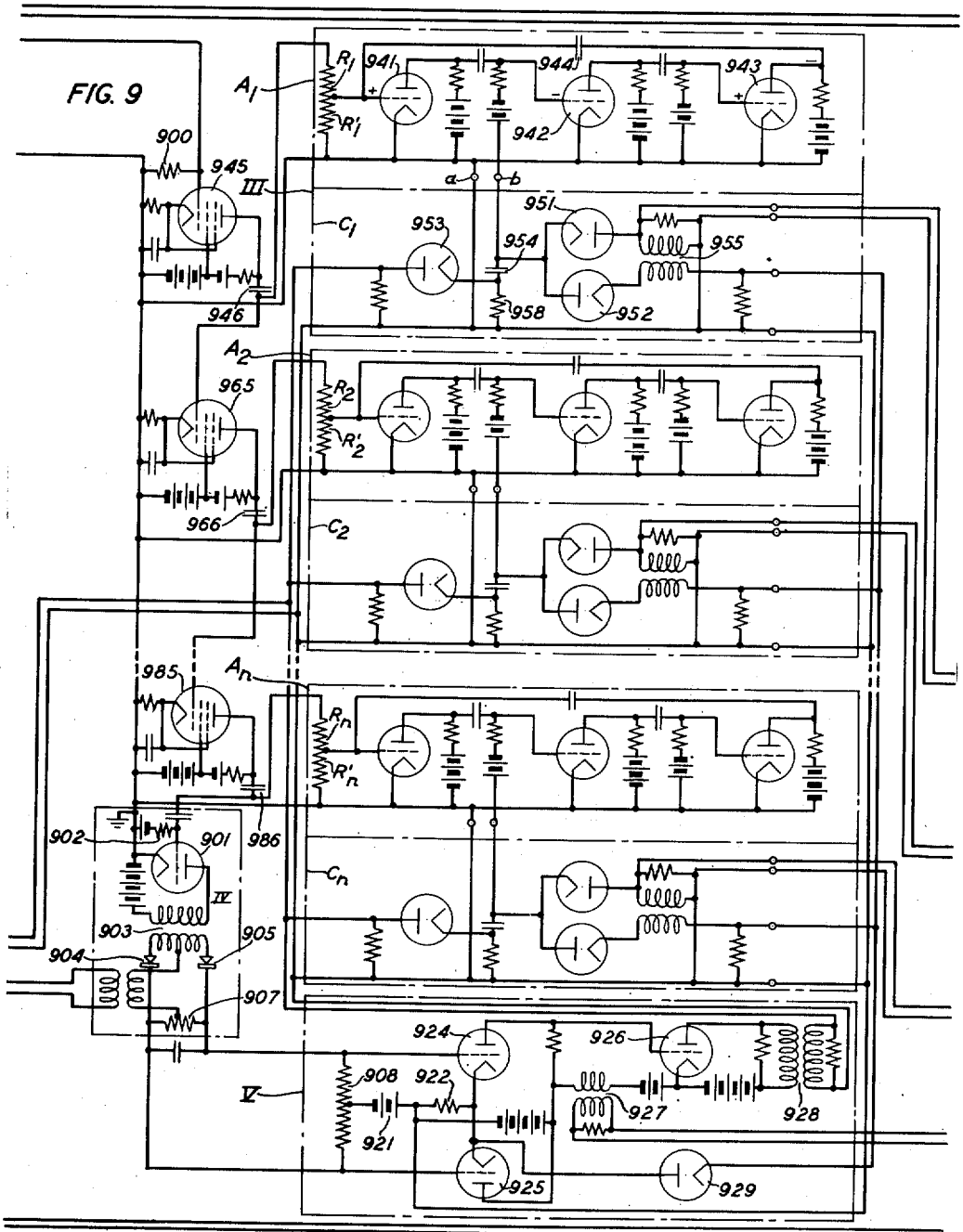
Figure 10:
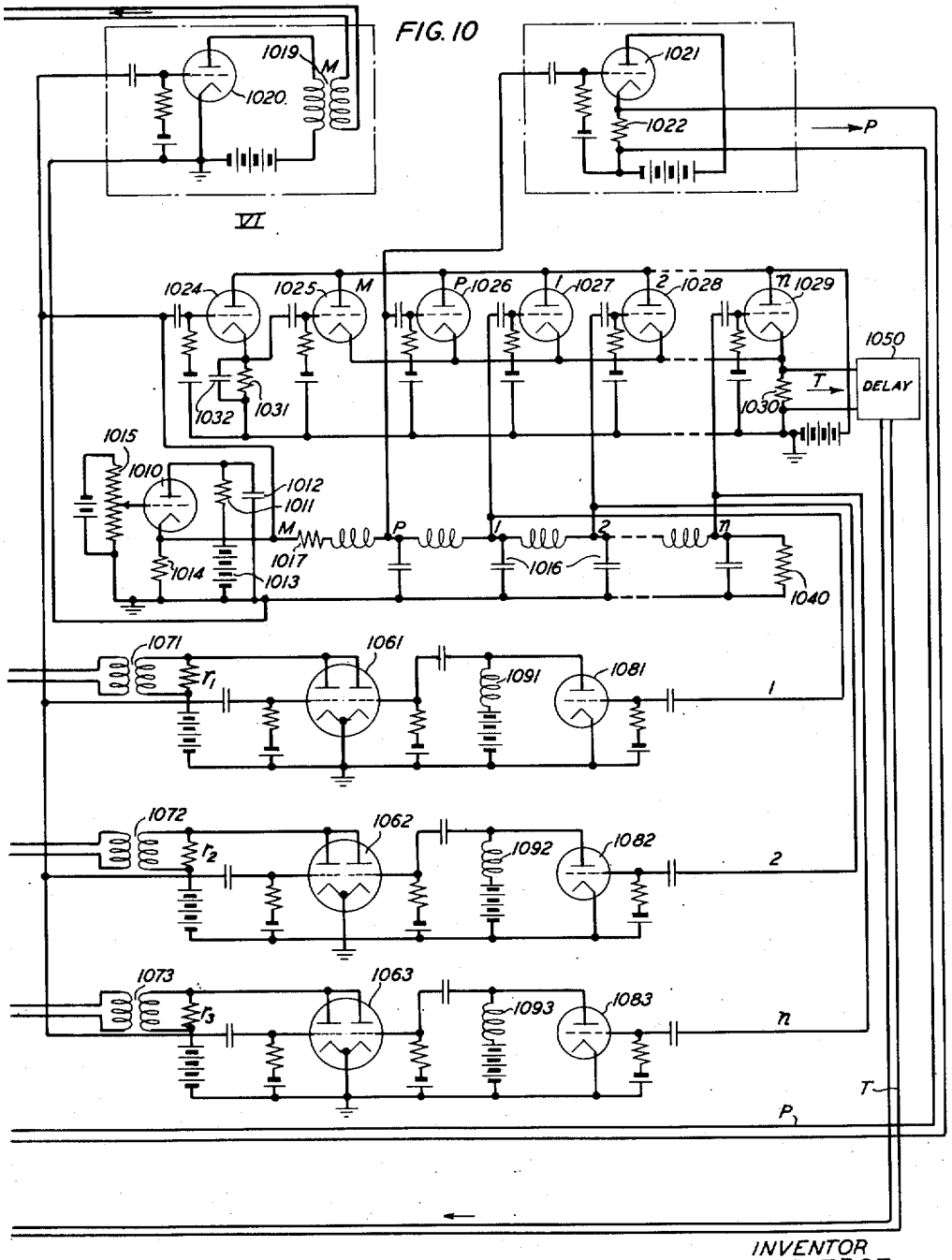
Figures 11, 14:
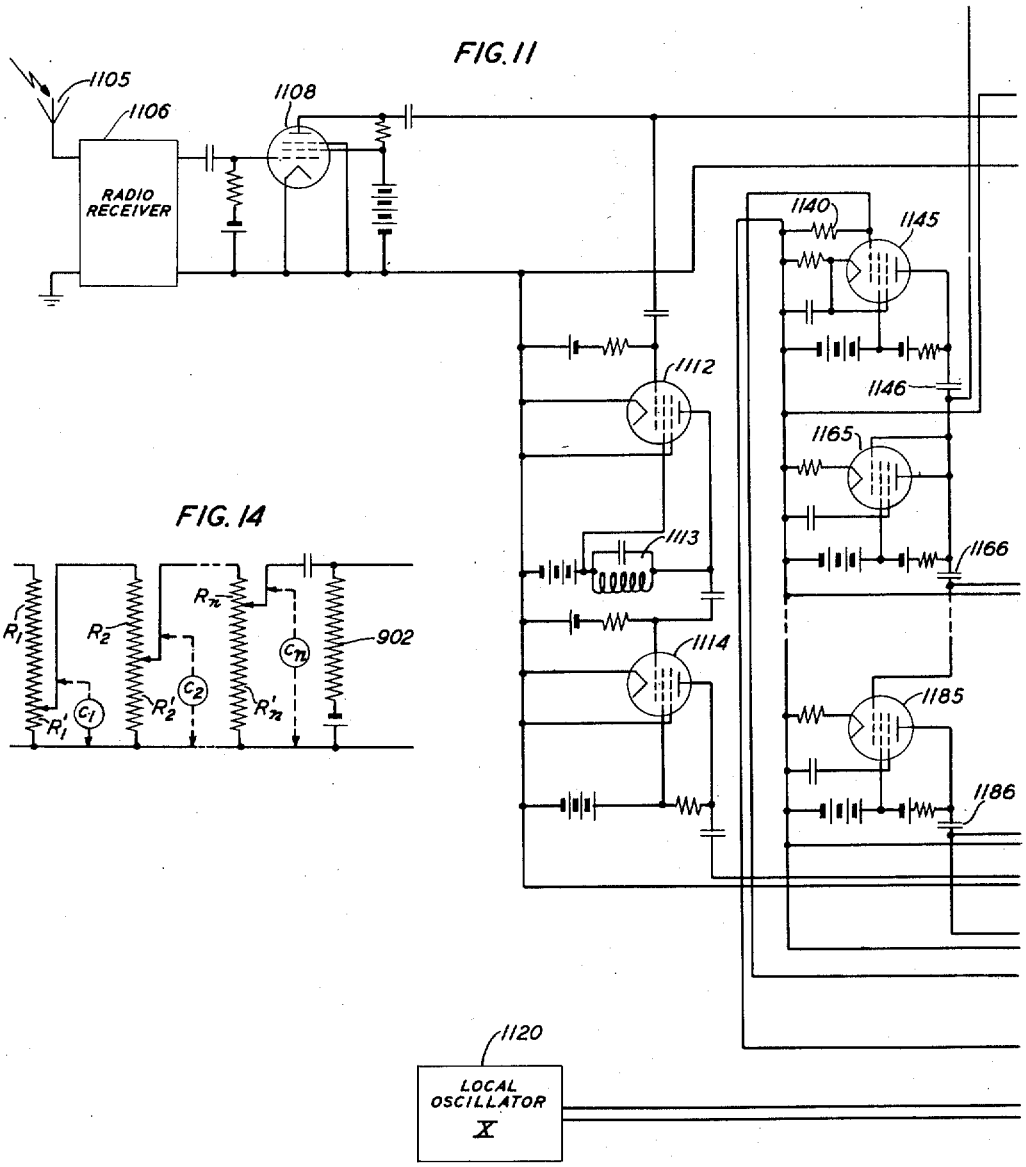

The invention itself both as to its organization and method of operation together with other objects and features thereof will be better understood from the following description taken with the accompanying drawings in which:

Figs. 1 and 2 show in [function] *functional* block form the various elements and the manner in which they cooperate to form an exemplary communication system embodying the present invention. Figs. 3 and 4 illustrate the timing and nature of the pulses and waves characteristic of my system. Fig. 5 is explanatory of the method and apparatus used for measuring or determining the amplitude of a complex wave sample. Figs. 8 to 13, when positioned as shown in Figs. 6 and 7, give in detail the various circuits and equipment of an exemplary system embodying the present invention. Fig. 14 relates to *a* modification of a portion of Figs. 9 and 11.

Referring more specifically to Fig. 1 let M be a modulating function representative of any complex wave such as a speech, telegraph or picture wave, a small portion of which is indicated by curve 301 of Fig. 3. A coder or modulator sends out a series of signals after each of the times $t_m$, $t_{m+1}=t_{m+T}$, $t_{m+2}=t_m+2T$ and so forth. Each series following a pulse which samples the wave, consists of 1+n signals of the "on"-"off" variety. (The signals need not be on or off but each signal distinguishes between two positions called "on" and "off." These might be positions of time, frequency or amplitude. "On" might be transmitted as a current being "off" and "off" as that of current being "on.") The first signal of the series or group is used to tell the polarity of the function M at the time the sample was taken. The next n signals of the group specify the magnitude of M at the time the sample was taken with respect to some arbitrary reference level of voltage or current. These n signals may be of such a character and so combined (advantageously on a binary system and so described in this specification for illustrative purposes) as to represent a large number of different amplitudes. Thus, for the case of eight signals there may be sent, between $t_m$ and $t_{m+1}$, the series of signals—on; on, on, off, on, off, on, off, or 00010101. The first zero carries the information that M is of negative polarity and the remaining signals that M is of amplitude 10.5 decibels above reference level, this value being obtained by binary counting. Here the smallest element of change has been taken as one-half decibel.

One specific means for obtaining such a series of signals is illustrated in the block diagram of Fig. 1. The over-all functioning will be described first and the possible nature of the block units will be described later.

While the functions described could be carried out without frequency conversion, grounding problems are simplified by first impressing the modulating function M on a balanced modulator I of Fig. 1, together with the output of a local oscillator II of frequency $f_0$, high compared with the frequencies occurring in M. At the time $t_m$ shown on Fig. 3, a pulse which will be referred to as an M pulse, from a pulse generator VI is impressed on modulator I. During the interval T between $t_m$ and $t_{m+1}$, when another M pulse is impressed on modulator I, the output current $I_m$ has a frequency $f_0$ and an amplitude proportional to M at $t_m$, being plus when M is plus at $t_m$ and minus when M is minus at $t_m$. At $t_{m+1}$ another sample of the complex wave is taken and for the next interval T the modulator output has the same frequency $f_0$ and the new amplitude. This is indicated in Fig. 3 in which the second line 302 shows the potential across a condenser (later to be described) and the third line 303 shows the oscillations of frequency $f_0$ associated with the successive M pulses. It should be noted that if M is negative, as in the last group shown in line 1, this is recorded by a reversal of phase of the modulated current of frequency $f_0$.

$I_m$ is fed to a homodyne detector IV associated with attenuating devices $A_1 \ldots A_n$. Local oscillator power from II is also supplied to IV. At the output of IV there is obtained a voltage or current which increases when M increases, is minus when M is minus and is plus when M is plus, although this output need not be linearly proportional to M.

The output of IV goes to polarity and amplitude detector V. This serves two purposes. First, after a pulse is applied to modulator I at $t_m$ and after a resetting pulse, later to be described, puts the attenuation of attenuator III at a minimum, a pulse is applied to V. If the polarity of M at $t_m$ is negative an impulse is sent to the transmitter VII and this, preferably in conjunction with a pulse from VI, causes the transmitter to send an "on" signal. If the polarity of M at $t_m$ is positive V sends no impulse to transmitter VII which in turn emits no signal, meaning "off." Second, the detector V serves to measure the output of the homodyne detector IV and to control the operation of the attenuator III in response thereto, as will be later described in detail.

The attenuation of the attenuator is controlled by a number of resistances $R_1, R_2 \ldots R_n$. These have "on" and "off" conditions corresponding to the digits of the binary numbers specifying the level of M at $t_m$ or other sampling time with respect to the arbitrary level. Thus, in the example previously given of $1+n=8$ the amplitude is specified by 7 digits. If one of them is beyond the binary "decimal" point then turning the various attenuations A "off" and "on" in this case changes the attenuation by the amounts listed below:

| | |
|---|---|
| $A_1$, 32 db. | $A_5$, 2 db. |
| $A_2$, 16 db. | $A_6$, 1 db. |
| $A_3$, 8 db. | $A_7$, .5 db. |
| $A_4$, 4 db. | |

These seven attenuations are thus capable of producing attenuations covering a range of 63.5 decibels in one-half decibel steps. Addition of one such channel roughly doubles the decibel range of attenuation available.

The attenuators $A_1 \ldots A_n$ are controlled electrically by control circuits $C_1 \ldots C_n$. These control circuits derive input from (a) the pulse generator VI and (b) the amplitude output of polarity and amplitude detector V.

The character and timing of these pulses are shown in Fig. 4 which is an expansion of the time interval between two sampling pulses or the time required for one cycle of operation. Here the second time interval T is shown. The negative portion of the M pulse resets the modulator I and the positive portion immediately thereafter takes the sample of the complex wave. At the same time the initial negative pulse shown on each of the *curves* 1—n of Fig. 4 places all A's in the minimum attenuation position. In the meantime the sample of the complex wave operates on the homodyne detector IV.

For instance, at $t_{m+1}$ a setting pulse place all A's in the minimum attenuation position. Then a polarity pulse P is applied to V and the polarity of M at $t_{m+1}$ is transmitted. Following this a positive pulse is applied to $C_1$. This changes $A_1$ and puts in say 32 decibels of attenuation. Immediately thereafter a negative pulse is applied to $C_1$. If the amplitude of the output of IV is still above the arbitrary level upon the insertion of attenuation the position of $A_1$ does not change and the attenuation stays in. No pulse is sent to the transmitter VII and no signal is sent, indicating "off." If, however, the amplitude falls below the arbitrary level on the insertion of this attenuation, the position of $A_1$ is changed back by the negative pulse and at the same time a pulse is sent to the transmitter VII. This, perhaps in combination with a pulse from pulser VI, causes VII to send an "on" signal.

Next, positive and negative pulses are applied in turn to $C_2 \ldots C_n$ resulting in either the insertion of the steps of attenuation they control and transmission of "off" signals or in the insertion and subsequent removal of the respective attenuations and transmission of "on" signals.

After the $1+n$ signals specifying the polarity and amplitude at $t_{m+1}$ have been sent, VI sends a resetting pulse to the controls $C_1 \ldots C_n$. This puts all A's at the minimum attenuation position. This pulse sends a marker signal T from the transmitter denoting the end of one interval and the beginning of the next. This pulse is simultaneous with the negative pulse applied to modulator I.

In a review of the system it will be convenient to refer in further detail to Figs. 3 and 4 showing the pulses required from the pulse generator VI. At the top there is shown a series of pulses coming over the channel M to the modulator I and a sample 302 of the complex signal wave 301 at the instant of each modulator pulse is taken. Operating on electrical elements the sample causes the modulator to emit, until pulsed again, a current $I_M$ of frequency $f_0$ and amplitude proportional to M at the sampling time. All this is indicated in the second and third lines of Fig. 3. A polarity pulse supplied to polarity and amplitude detector V arrives an interval later and this is succeeded by pulses over channels 1, 2 . . . n which operate on the attenuators $A_1 \ldots A_n$. There may also be a pulse channel T to the transmitter as shown in Figs. 8, 9 and 10, necessary if the "o" signals are transmissions and not merely omissions. All this is shown in Fig. 4 which is an expansion on a time basis of one of the sampling periods of the system.

At the time of the M pulse, channels 1 to n are pulsed with strong negative pulses setting $A_1 \ldots A_n$ in the minimum attenuation positions. Next the polarity and amplitude detector V is pulsed by the polarity pulse P. This results in pulse to transmitter VII if the polarity is negative and an "on" signal from the transmitter, or no pulse to VII if the polarity is positive and an "off" signal from the transmitter.

The n amplitude channels are pulsed in sequence; first positive and then negative. The positive pulse inserts attenuation, the negative pulse removes attenuation if the attenuated output of IV has fallen below the arbitrary level and in doing so sends an "on" signal, otherwise the attenuation stays in and there is an "off" signal. As shown in Figs. 8, 9 and 10, the channel T applies pulses to transmitter VII at all times whether an "on," "off" or a "marker" signal is to be used. These pulses will give an "on" signal from the transmitter in combination with a pulse from $A_1 \ldots A_n$ or V.

While a number of different types of devices may be contrived to perform the functions of the representative blocks of Figs. 1 and 2 a better understanding of the invention will be obtained by specific illustrations of circuits to accomplish the desired ends. These will now be described but it is to be understood that they are illustrative only and that my invention is not limited to the specific circuit arrangement shown.

For a description of the transmitting end of my system reference should be made to Figs. 8, 9 and 10 in which the various block components of Fig. 1 are represented by the same Roman numbers.

The complex wave *to be* transmitted is impressed on the balanced modulator system I, this complex wave having come from any suitable source such as a microphone 805 through appropriate terminal equipment 806. It is then sampled periodically and goes through the process to be described in further detail.

Pulse generator

It will be advantageous to now describe the pulse generating system VI, one form of which is shown in detail in Fig. 10. The first controlling element in this portion of the system is a relaxation oscillator comprising a gas tube 1010. This relaxation oscillator is of a form well known in the art and includes a resistance 1011 for charging a condenser 1012 from the battery 1013. Assuming, that, to start with, the condenser 1012 is discharged then on closure of the circuit it is charged at a rate determined by the resistance 1011. When the potential of the condenser and consequently of the plate of tube 1010 rises to a "firing" value, the condenser suddenly discharges through the tube and resistor 1014. The duration of the discharge is short and gives rise to a sharp positive pulse across the resistor 1014. The duration of this pulse and the rate at which it is followed by identical pulses can be completely controlled by the parameters of the circuit; in particular, by the values of the elements 1011 to 1014 taken with the potential of the grid of tube 1010 as determined by the potentiometer 1015. While any of several forms of relaxation circuits may be used at this point the one shown is simple and satisfactory. Its operation is more fully described in many places, such as on page 184 of "Ultra-High Frequency Technique," by Brainerd et al., published by Van Nostrand Company, 1942.

The positive pulse from 1014 is now used to control the emission of pulses to various parts of the circuit. This is accomplished by connecting across the element 1014 a delay circuit 1016 made up of identical sections of inductance and capacitance connected seriatim. A positive pulse travels through this network, this time of arrival at each section being uniformly spaced and giving rise to corresponding [positive and negative] pulses going out over channels 1, 2 . . . n for purposes to be described. The delay network is terminated by a load 1040 of proper value to suppress any reflected wave.

The parameters of the relaxation oscillator may be adjusted so that pulses are derived across resistance 1014 at any frequency desired. For the purposes of my invention it is preferred to have a sampling frequency higher than that of the highest frequency component in the complex wave to be transmitted. If, for example, this wave is to be a speech wave and it is desired to transmit all components up to 4,000 cycles then there should be at least two samples per cycle of this highest frequency component. A suitable value, therefore, for the relaxation oscillator frequency would be 8,000 cycles although a higher value may be used if desired.

By means of the delay circuit or "timestick" 1016, one has available at the ends of the respective sections, positive pulses similar to that initiated in 1014 and spaced in time, one after the other, by an interval determined by the elements in a section of the timestick. At time $t_m$ when the pulse is formed at 1014 it is transferred immediately to tube 1020 and is then transferred to modulator I as the M pulse of Fig. 3. The function of this pulse will be described hereinafter.

At one element of time later the positive pulse from 1014 will have reached the point P on the timestick and this will be identified as the P pulse. This P pulse operates on the grid of tube 1021 to give a positive pulse over the resistor 1022 which pulse is transmitted to the polarity and amplitude detector V, appearing there as a positive pulse of a form and at a time indicated by line P of Fig. 4.

At the end of succeeding elements of time the positive pulse from 1014 will arrive at points 1, 2 . . . n of the timestick and then are transferred respectively to the grids of tubes 1081, 1082, 1083, etc. Each of these pulses in its subsequent path is converted into a positive-negative pulse in a manner and for the purpose hereinafter described.

In addition to these pulses it is desired to send a group of corresponding pulses to the transmitter VII which pulses will be identified as T pulses and are indicated in the bottom line of Fig. 4. It will be noted that the first pulse in this cycle is longer and of greater amplitude than the subsequent pulses, this for reasons which will appear later. The first T pulse may, for instance, be approximately twice the length of the subsequent pulses. For the formation of the T pulses a chain of tubes 1024 to 1029 is provided. The grid of tube 1024 is operated on directly by the pulse from M. In the cathode circuit there is included the resistance 1031 paralleled by the condenser 1032. A positive pulse is generated across 1031 and the duration of this pulse would ordinarily be the same as the duration of the M pulse. However, the addition of a condenser 1032 will lengthen this pulse and the condenser is so chosen as to approximately double the duration. The positive pulse from 1031 is applied to the grid of 1025, the cathode circuit of which includes the resistor 1030. There is then transmitted over the T channel to the transmitter VII, at the time of the M pulse on the timestick a positive pulse of approximately twice the duration of the M pulse. The relative magnitude of this pulse can be controlled by adjusting the resistance 1017 in series with the timestick 1016. As the positive pulse over 1014 reaches successively the points P, 1, 2 . . . n the grids of the tubes 1026 to 1029 are operated upon and set up positive pulses across 1030 which is a common cathode resistor for all the tubes 1025 to 1029. Consequently there is transmitted the desired series of positive pulses to the transmitter VII indicated in Fig. 4. For the purpose of synchronizing these pulses with the remainder of the equipment, delay circuits may be introduced wherever necessary. One such delay circuit is shown in the T channel at 1050.

Following the M pulse and the P pulse the number of sections in the timestick will usually be made equal to the number of digits required for setting up the amplitude code to be transmitted from VII. If there should be n of these then the number of possible codes by permutation of "on" and "off" signals would be $2^n$. Thus, if the number of digits in the code is seven this will make possible 128 combinations, so that in the system it will be possible to discriminate between amplitudes of 128 different values.

Associated with conductor 1 for the timestick and tube 1081 is a circuit comprising tube 1061 and transformer 1071. The tube 1061 is shown as a double triode. The grid of the left-hand section of this tube receives a relatively large positive pulse at $t_m$ which is then converted at the plate to a negative pulse. This negative pulse is transferred through transformer 1071 as a negative pulse to the control of the corresponding attenuation [device] device A1 in Fig. 9 and serves as hereinafter described to set this attenuation element to a minimum attenuation. Shortly thereafter a positive pulse arriving over conductor 1 to tube 1081 is inverted and appears as a negative pulse on the grid of the right-hand section of tube 1061. However, the load circuit of tube 1081 includes the inductance 1091 which causes the negative pulse generated on the plate of 1081 to be immediately followed by a positive pulse so that the pulse arriving on the grid of the right-hand section of 1061 is a negative-positive pulse. This pulse in turn is inverted by the right-hand section of tube 1061 to a positive-negative pulse which is then transmitted through the transformer 1071 to the control circuit of attenuator A1. The character and timing of this positive-negative pulse is that indicated in line 1 of Fig. 4.

A similar circuit is associated with each of the conductors 2, 3 . . . n to give at the time of the M pulse a relatively large negative pulse to the corresponding attenuation control devices setting each attenuator to a minimum attenuation and at a later time transmitting a positive-negative pulse to the control devices of the respective attenuators in the same manner and at times indicated by lines 2—n of Fig. 4.

Various electrical elements appear in the circuit associated with each of the tubes thus far described. Thus across the primary of the transformers 1071, etc., there appear the resistor $r_1$, $r_2$, and $r_3$. These are present elsewhere also and they are for the purpose and of a value to sharpen the pulses which are transmitted by the corresponding transformers and to suppress their differentiating action, thus preventing the setting up of an additional reverse pulse. Other elements all serve purposes well known to those skilled in the art and need not be described further.

Modulator I

A description will now be given of the modulator circuit I as shown in Fig. 8. A complex wave made up of numerous frequency components, the highest one of interest being for the present taken as 4,000 cycles, arrives at the primary of transformer 810. At time $t_m$ a positive pulse arriving on the grid of tube 1020 is inverted by transformer 1019 and is impressed as a negative-positive pulse on the plate and cathode of diodes 811 and 812. The negative pulse causes current to flow through 812 and discharges condenser 814. When the positive pulse arrives immediately thereafter it causes current to flow through 811 charging the condenser 814 to a definite potential, this potential being equal to this positive pulse plus that of the amplitude of the complex wave M at $t_m$ minus a constant bias potential determined by battery 816. The grid of triode 820 is held at this potential minus a bias potential due to 821 until another pulse is applied at $t_{m+1}$. The output of the amplifier tube 820 appears as a voltage across the resistance 825 and controls the operation of a conventional balanced modulator of any suitable form. As here shown it involves two varistors $v_1$ and $v_2$. Associated with this balanced modulator is also a source of local oscillations II of frequency $f_0$ high compared to the pulse frequencies present in the system. In a manner well understood in the art there will appear in the secondary of transformer 830 a wave of carrier frequency $f_0$, the amplitude of which will be proportional to the potential across resistor 825. The phase of the voltage in the secondary of 830 reverses as the voltage across 825 reverses. The output of the secondary of 830 is connected to the grid circuit of a pentode 835 which, in turn, yields an output current $I_m$. This current is almost independent of the load consisting of a resistor 900 and an antiresonant circuit 837 [is] *in* parallel and associated elements to be described hereinafter. It also gives a proportional voltage $c_m$ across the resistor 900.

Local oscillator II

The local oscillator II may be any one of the suitable forms well known in the art yielding a substantially sinusoidal output of reasonably constant frequency.

The load of the pentode 835 includes the plurality of attenuators connected in tandem and shown in Fig. 9. These attenuators comprise a plurality of tubes 945, 965, etc. connected in tandem the gain or loss being determined by the amount of controlled attenuation introduced. The purpose of these attenuators is to receive at the input circuit of the first attenuator a voltage proportional to the current $I_m$ and to reduce this voltage step by step to, as nearly as possible, a certain reference level, all in the manner hereinafter described.

Homodyne detector IV

Associated with the last stage of the attenuators is the homodyne detector circuit IV, the purpose of which is to demodulate the arriving current of frequency $f_0$. The homodyne detector comprises a tube shown as a triode 901, the purpose of which is to serve as an amplifier but still more to be of a character to add no appreciable attenuation to that which has been introduced in the load circuit of the last attenuating pentode 985. Associated with the output of 901 through the transformer 903 is a demodulator circuit comprising two varistors 904 and 905. It is supplied with oscillations from local oscillator II. The output of this modulator will give a voltage across resistor 907 of magnitude dependent on the amplitude of $I_m$ as modified by the attenuators. As long as the high frequency current $I_m$ is of one phase as represented in the first three sections of the third line of Fig. 3 one terminal (say the right-hand terminal), of resistor 907 will be positive and this will be referred to as a positive output. If, however, the magnitude of the complex wave takes on a negative value, as shown by the fourth pulse of line 1, Fig. 3, the high frequency wave appearing at the secondary of 830 will reverse in phase, still being of an amplitude proportional to the sample. Thus the polarity across the resistor 907 will also reverse. In this way the homodyne circuit yields information which later is used for detecting the polarity and amplitude of the complex wave sample.

Polarity and amplitude detector V

The polarity and amplitude detector V is shown in the lower box of Fig. 9. If the homodyne detector output over the resistors 907 and 908 is above some arbitrary reference level controllable by bias 921 current flows in one or the other of the triodes 924 or 925. If the homodyne output is in the direction to raise the potential of the grid of 924 and has sufficient amplitude then the grid of tube 926 will be highly negative. Therefore a pulse coming from tube 1021 and applied in the grid circuit through transformer 927 will cause no pulse in the output of tube 926 and no pulse on the line leading therefrom to the transmitter VII. If the homodyne output has the opposite polarity the grid of 926 will be only slightly negative and the pulse through transformer 927 will cause plate current to flow, sending a pulse via transformer 928.

If the output of the homodyne detector is larger than the arbitrary value in either direction current will flow in diode 929 because of the drop over resistor 922 caused by the flow of current through the respective tube 924 or 925 thus applying a positive bias to the attenuator controls and preventing a negative pulse coming from the pulse generator to any particular control from removing the attenuation.

Attenuator III

In Fig. 9 there are shown a plurality of attenuators and attenuator control circuits one for each digit in the amplitude code. Three such units are shown but inasmuch as their action is identically the same except for timing it is necessary to describe only one of these, identified by the block III, which includes the first attenuator of the series. Each of the units III comprises a controllable attenuation circuit as $A_1$ and a controlling circuit as $C_1$. Each attenuation circuit is associated with the coupling circuit between a pair of tubes 945, 965, etc. These tubes are shown as essentially constant current devices and the voltage which is passed from one tube to the next is proportional to the impedance of the coupling network. By controlling the resistance of the grid resistor in that network any degree of attenuation may be obtained.

Each of the tubes 945, 965, etc. will have a gain which is determined among other things by the impedance of the coupling network from one tube to the next. This will be a maximum when "no attenuation" is introduced and the over-all gain for the series of tubes under this condition will be assumed as definite and will take on any predetermined value from say 1 to as high a figure as desired. When reference in this specification is made to attenuation, it is understood that this refers to the attenuation or "loss" in decibels from that predetermined gain.

The attenuation circuit is essentially a shunt feedback amplifier. It includes the resistances $R_1$ and $R_1'$ and connected in series, the intermediate point being connected to the three-stage amplifier including the tubes 941, 942 and 943 with resistance capacitance coupling, there being a feedback connection from the plate of the last tube 943 through condenser 944 to the grid of 941. It will be appreciated that some other form of coupling, as antiresonant coupling may be used. There is either zero or a very large gain around the loop depending on whether the control voltage applied to terminals a and b cuts off one or more tubes in the loop or allows them to operate. In this instance the loop is opened by a sufficiently high negative bias on the grid of tube 942. Under these conditions the coupling resistance of $A_1$ from tubes 945 to 965 is essentially $R_1+R_1'$ and the attenuation for this stage is a minimum. If a positive potential of sufficient value arrives at the point b then the loop is closed and if the gain through the circuit containing tubes 941 to 943 is high then $R_1'$ is virtually short-circuited and the coupling resistance of $A_1$ is essentially $R_1$, almost independent of gain. Thus a high accuracy of control of $A_1$ can be obtained independent of tube characteristics. Whereas for illustrative purposes the control has been shown on one tube only it may be desirable to control the bias on several or all tubes in order to open the loop completely.

The control part of the attenuator comprises a plurality of diodes 951, 952, and 953 and associated elements. When a positive pulse over channel 1, supplied through tubes 1081 and 1061 of Fig. 10, is applied the diode 951 conducts, charging the condenser 954, applying a positive potential to point b and closing the feedback loops thus increasing the attenuation $A_1$. Immediately thereafter a negative pulse is applied through transformer 955 to diode 952. If this is the only pulse present on diode 952, that is, if insufficient positive bias arrives from the amplitude and polarity detector V, meaning a homodyne detector output below a certain reference, the negative pulse discharges condenser 954 and opens the feedback loop thus removing the attenuation $A_1$. At the same time current flows in resistance 958 and through diode 953 sending a negative pulse to the transmitter resulting in the transmission of an "on" signal. If there is a positive bias of sufficient magnitude from the amplitude detector through diode 929, meaning a large homodyne output, the negative pulse through transformer 955 is not sufficient to cause current to flow through diode 952. Consequently the attenuation remains in and no pulse is sent to the transmitter.

If the attenuation $A_1$ remains in, the residual signal arriving at tube 901 is correspondingly attenuated. With the arrival of the next pulse, corresponding to channel 2, the sample is again tested by the introduction of attenuation $A_2$, followed by its removal if necessary as determined by the test.

This is made clearer by reference to Fig. 5 in which for simplicity it is assumed that, exclusive of the polarity pulse, a 7-place amplitude code is to be used on a binary system. This makes it possible to discriminate between about 128 different amplitudes on a decibel basis. If the amplitude is to be expressed in terms of a reference level $e_0$ and if the smallest change to be observed is one-half decibel then the range of amplitude on a power basis would be from .5 decibel to [63 5] *63.5* decibels, as suggested on the table of page 8. The first attenuation would introduce a loss of 32 decibels, the next a loss of 16 decibels and so forth and the operation of the circuit is such as to introduce a total attenuation in decibels which is as nearly as possible equal to the decibel amplitude of $e_m$ as compared with the reference level $e_0$.

If, for illustration, the sample amplitude $e_m$ appearing across the resistor 900 is 46.6 decibels above $e_0$ then the introduction of $A_1$, on the arrival of pulse over channel 1, with an attenuation of 32 decibels will leave a residual of 14.6 decibels, as indicated at a. This is substantially above reference level and therefore $A_1$ stays in. Had it been less than zero decibels the attenuation would have been removed. The positive pulse over channel 2 now introduces $A_2$, of attenuation value 16 decibels, giving a total attenuation of 48 decibels and a reduction to −1.4 decibels, which is less than reference level as indicated at b and so the negative pulse removes the attenuation. The pulse over channel 3 now introduces $A_3$, of attenuation value 8 decibels, giving a total of 40 decibels and a reduction of the residual to 6.6 decibels as shown at c, more than reference level and so $A_3$ stays in.

The next step $A_4$, of attenuation value 4 decibels, gives a total of 44 decibels. The residual is now reduced to 2.6 decibels and therefore $A_4$ stays in. On the next step $A_5$, of 2 decibels value, is added and brings the total attenuation to 46 decibels with a residual of .6 decibel and therefore $A_5$ remains in. $A_6$ introduces an additional 1 decibel giving a total of 47 decibels and a residual of −.4 decibel, less than reference level and therefore $A_6$ is removed. $A_7$, which uses up the last step in the 7-digit code assumed, introduces .5 decibel for a total of 46.5 decibels. This leaves a residual of +.1 decibel and so $A_7$ remains in. Thus the total attenuation introduced in front of tube 901 is 32+0+8+4+2+0+.5=46.5 decibels and a corresponding code of off, on, off, off, off, on, off (or the equivalent of + − + + + − +) will have been set up. The marginal operation of the circuits is so adjusted that since the amplitude is in excess of 46.5 decibels, the negative pulse for $A_7$ would not be sufficient to remove it. If slightly less than 46.5 decibels, the negative pulse would have removed it.

It will appear from the above explanation that the final total attenuation introduced is proportional to the amplitude of the sample, within the smallest adopted decibel step as applied to the reference level unit. The percentage accuracy will be independent of the amplitude of the sample. This may be shown as follows:

Let
$e_m$=the input voltage to be measured.
$e_0$=reference voltage.

If the introduction of n decibels of attenuation leaves a residual slightly above 0 decibel level, this corresponds to an input voltage $e_1$, where $$e_1=e_0\times 10^{\frac{n}{20}}$$

If the introduction of (n+.5) decibels reduces the residual to slightly below 0 decibel level, this corresponds to an input voltage $e_2$, where $$e_2=e_0\times 10^{\frac{n+.5}{20}}$$

Thus $$\frac{e_2}{e_1}=\frac{10^{\frac{n+.5}{20}}}{10^{\frac{n}{20}}}=10^{\frac{1}{40}}=1.6 \text{ approximately}$$

$$e_2>e_m>e_1$$

Therefore maximum error for $e_m=\bar{6}$ per cent. This is the same for large or small input amplitudes within range of $e_0$ to $$e_0\times 10^{\frac{64}{20}}(=1585e_0)$$

On completion of this process the voltage delivered to the input of tube 901 has been adjusted as nearly as possible to the constant arbitrary reference voltage $e_0$. Since the total attenuation $A_t$ is given by the binary number represented by n "off" or "on" signals, this number also expresses the amplitude of current $I_m$ and hence the amplitude of M at the sampling time.

By using a code of fewer digits the system would be simplified but at the expense of range or granularity. By extending to a code of a higher number of digits any degree of fineness of granularity and corresponding fidelity may be obtained.

It will be observed that this mode of building up attenuation to match a sample amplitude is essentially a multiplicative or divisive process starting with large decibel steps and going to smaller ones until the last degree of fineness contemplated has been attained. Being multiplicative or divisive on an absolute basis it becomes additive or subtractive on a logarithmic, that is a decibel basis. This multiplicative or divisive characteristic is peculiar to this system and constitutes a distinguishing feature, as is pointed out in the appended claims.

Transmitter unit VII

During this procedure there has been arriving at transformer 850 a series of pulses over channel T, one for each pulse from the pulse generator, timed as indicated on the bottom line of Fig. 4. These pulses may be used to operate on a grid of the tube 855. In addition, there [arrives] *arrive* at the transformer 852 certain pulses, one for each "on" pulse, relating to polarity or indicating that one of the attenuators has been introduced and then removed. No pulse will come to the transformer 852 if an attenuator has been introduced but not removed, this corresponding to an "off" signal. The secondary of the transformer 852 operates on a second grid of tube 855 and this tube in turn controls the transmission or absence of transmission over a suitable medium to a remote station. In Fig. 8 the tube is shown as controlling a transmitting terminal unit 860 for a radio channel on a suitable carrier but it is to be understood that the pulses coming from the tube 855 may go directly to any suitable transmission path such as a pair of wires, a coaxial cable, etc. In such cases it is not necessary and may not be desirable to use the pulses for modulating a carrier. The connections of the transformers 850 and 852 are such that a pulse arriving at 850 alone will not cause the transmission of a signal but the simultaneous presence of a pulse on 850 and on 852 would be effective in causing such transmission and would correspond to an "on" signal. This is so except in the case of the first broad pulse of the T series which is purposely made greater in amplitude than the others so that it can operate tube 855 alone. The purpose of the pulses coming over the T channel is to assure proper timing coordination of the transmission of signal pulses. In some instances such added precaution will not be necessary in which case the T channel may be omitted, including the chain of tubes 1024 to 1029 of Fig. 10 and the transformer 850. In this case also the adjustment of the transformer 852 alone and tube 855 is such that a pulse on 852 will then be sufficient to cause transmission.

Receiver

The problem of recovering the modulation function at the receiver station is somewhat simpler and will be first described by means of the block diagram of Fig. 2. For the example here described pulses forming the signal appear at A for all "on" signals. A pulse generator VIII is synchronized with the incoming pulses, perhaps by means of a marker pulse such as the M pulse from the transmitting station, so that its operations coordinate properly with the incoming signals. This generator sends out pulses to various devices which also receive the signal. These received signals alone, or the pulses alone will not cause operation. A signal pulse in conjunction with a pulse from VIII will cause a device to operate.

At the time when the signal corresponding to polarity appears the pulse generator applies a pulse to a phase shifter IX. If there is an "off" signal; i. e. no signal pulse the phase shifter is set to shift phase 180 degrees; if an "on" signal the phase shifter is set to shift phase zero degrees. The phase shifter remains in this position until receiving another P pulse.

The next pulse of the pulse generator is sent to the control $C_1$ which controls a change of attenuator $A_1$ proportional to that of $A_1$ of Fig. 1. The attenuation is initially at a minimum. If the received signal is an "off" signal, attenuation is left at a minimum. If an "on" signal is received this causes operation and $A_1$ is switched in. The next pulse from VIII goes to $C_2$ at the same time that the signal from $A_2$ of Fig. 1 arrives and so on through $A_n$. Thus, the total attenuation is made the complement to that introduced in the transmitter of Fig. 1 which gave rise to the "on" and "off" signals. Then after a short time, perhaps the next marker pulse corresponding to time $t_{m+1}$ at the sender, a pulse from the pulse generator enables the local oscillator X. This acts as a constant voltage source of desired frequency impressing a voltage on the input of the attenuator and sending current through resistance R and to the homodyne detector XI. R is made large in order to add negligible attenuation. From the voltage drop across R there is produced an output pulse from the homodyne detector XI nearly proportional to the amplitude M at the sampling time. A reset pulse may follow the pulse to oscillator X. This will reset $A_1 \ldots A_n$ and phase shifter IX to the initial position in preparation for succeeding sample codes. The pulses from the detector XI are passed through a low-pass filter XII. If the highest frequency $f_m$ in the complex wave is $f_m = \frac{1}{2}T$ and if the low-pass filter has a cut-off of $f_m$, a signal proportional to M, but delayed perhaps by T seconds, is recovered at the output of the low-pass filter. Here T is the length of a period between $t_m$ and $t_{m+1}$; i. e. between sampling times.

With this brief description of the block diagram of Fig. 2 we may now proceed to a more detailed description of devices which will accomplish the steps set forth above. It will be apparent to those skilled in the art that there are numerous circuit arrangements for accomplishing this. Certain specific arrangements are here shown in Figs. 11, 12 and 13 but these are illustrative for the sake of concreteness and it is to be understood that many variations may be made without departing from the spirit of my invention.

Referring more specifically to Fig. 11, there is shown a receiving unit 1106, here indicated as a radio receiver associated with a suitable receiving antenna 1105. This unit 1106 is a radio receiver of any suitable type including a detector the output of which yields the pulse signals as a reproduction of the pulses arriving at the transmitting unit VII of Fig. 8. This code pulse message is amplified to any necessary extent as illustrated by the tube 1108 and the output thereof is shown as going to a plurality of control devices $C_1 \ldots C_n$, one associated with each of a plurality of attenuators in a manner hereinafter to be described.

Receiver pulse generator VIII

Figure 13:
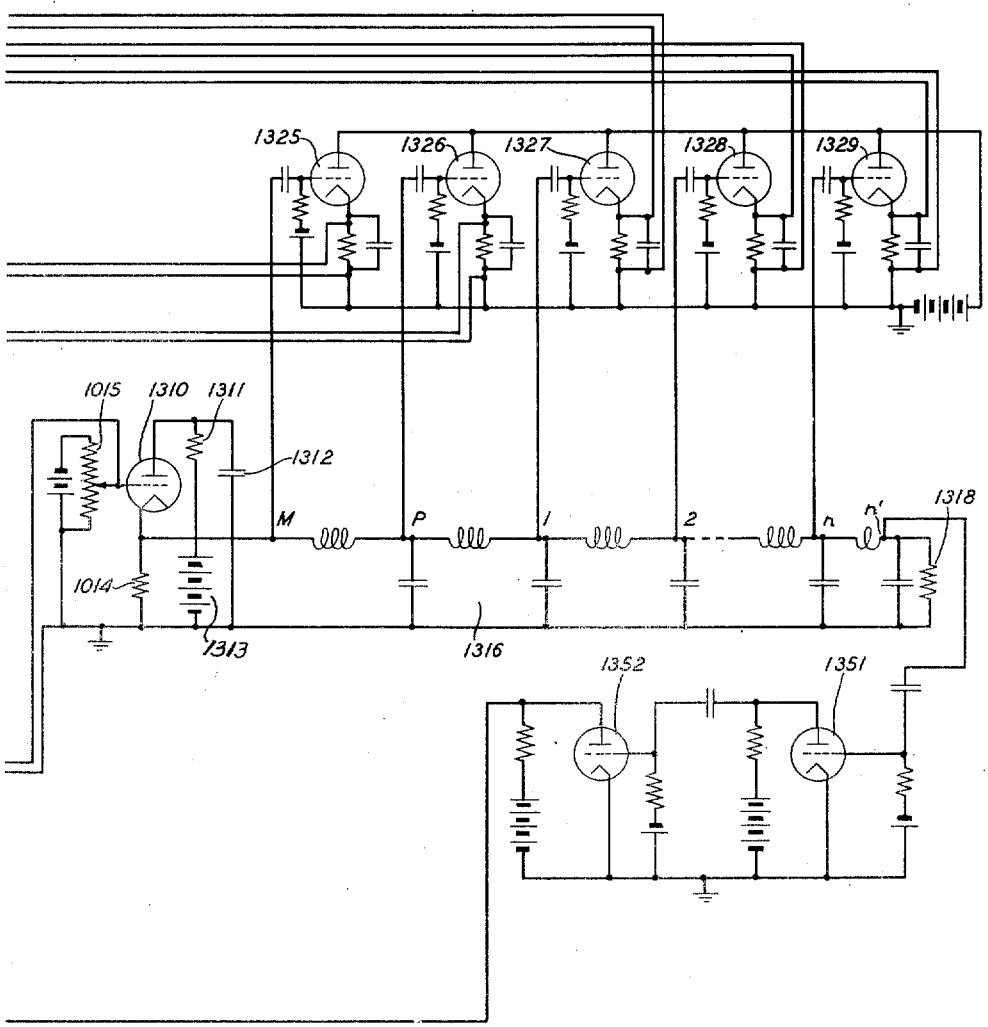

A derived path from the output of 1108 passes through suitable amplifiers as shown at 1121 and 1114 and an outward pulse therefrom is used to control a relaxation oscillator shown in Fig. 13. This relaxation oscillator, centering about the gas tube 1310, may be similar in every respect to the relaxation oscillator at the transmitting station and shown in detail in Fig. 10. Corresponding to each of the units 1010 to 1015 in Fig. 10 there are the units 1310 to 1315 in Fig. 13 The adjustment of the parameters in the relaxation oscillator of Fig. 13, however, is such that the circuit does not normally oscillate but is triggered by a pulse arriving from tube 1114. Furthermore, the parameters of this relaxation oscillator are so adjusted that the circuit will be triggered by the first pulse in a group (corresponding to the M pulse at the transmitter) after which the oscillator cannot be triggered until the arrival of the next M pulse.

This is accomplished by the use of the long initial T pulse of Fig. 4 to which reference has been made. It is to be borne in mind that all pulses transmitted by VII are of the same amplitude. However, since the tube 1112 is essentially a constant current device, the voltage built up in the tank circuit 1113 is proportional to the duration of the incoming pulse and thus the long initial T pulses arriving at 1310 and corresponding to the M pulses will be of greater, perhaps double, amplitude and so be able to trigger the relaxation oscillator, whereas the other pulses in the cycle will not.

In a manner analogous to that of Fig. 10 there is associated with the relaxation oscillator a timestick 1316 from which a series of pulses may be derived with a time spacing as nearly identical as may be necessary to the time spacing of the pulses derived from the timestick at the transmitting station. This timestick has an additional section giving rise to a pulse indicated by n′ and delayed only slightly behind the previous pulse. The function of the pulse n′ will be given hereinafter. The timestick is terminated with a suitable impedance 1318 to suppress reflection. Also there is a series of tubes 1325 to 1329 from *the cathodes of* which a series of positive pulses *is* derived [from cathode followers is initiated,] corresponding to the pulses from the timestick.

Receiver attenuators XIII

The utilization of the various pulses to control the setting up of a series of attenuators $A_1 \ldots A_n$ in consonance with those set up at the transmitting station will now be described. For this reference may be made to Fig. 12 and the right-hand portion of Fig. 11. In this latter portion there is shown a series of tubes 1145, 1165 and 1185 connected in tandem and analogous to the corresponding circuit of Fig. 8. The coupling from one tube to the next is a resistance capacitance network, a resistance therein being subject to change whereby the portion of the voltage generated in one tube and passed to the next is attenuated by definite amounts, the amount of this attenuation being conrollable in accordance wih the code signal which is being received. Thus, the output circuit of tube 1145 includes the attenuator circuit $A_1$. $A_1$ comprises the resistances $R_1$ and $R_1'$ connected in series, the intermediate point being connected to the three stage amplifier comprising the tubes 1241, 1242, 1243 with resistance capacitance or other suitable coupling, there being a feedback connection from the plate of the last tube 1243 through condenser 1244 to the grid of 1241. There is either zero or a large gain around the loop depending on whether the control voltage applied to terminals a and b cuts off one or more tubes in the loop or allows them to operate.

One mode of operation will be described in connection with $A_1$. Here, as in Fig. 9, the loop is normally held open by a sufficiently negative bias on the grid of tube 1242. Under these conditions, the grid resistance in the input of tube 1165 is $R_1+R_1'$. If a positive pulse of sufficient magnitude arrives at b then the loop is closed and if the gain through the circuit is high, the grid resistance is essentially $R_1$, almost independent of gain, and a corresponding attenuation is introduced. Again, whereas for illustrative purposes the control has been shown on one tube only it may be desirable to control the bias on several or all tubes in order to open the loop completely.

The control portion $C_1$ of the attenuator may take on a large variety of circuit forms so long as it performs the desired function in response to the pulses reaching it and may comprise one or more diodes or combinations of diodes and triodes or multigrid tubes in a variety of ways as will be clear to those skilled in the art. Specifically in Fig. 12 it is shown as a combination of a diode and a triode. A positive pulse corresponding to the M pulse from the timestick operates through transformer 1252 so poled as to make the cathode of diode 1251 negative, whereupon any positive charge on condenser 1254 is discharged and the negative bias on tube 1242 opens the attenuator loop. This occurs simultaneously on all of the attenuator units at the beginning of a cycle and sets all the attenuators at minimum attenuation.

In due course a pulse from circuit 1 of the timestick and tube 1327 arrives at transformer 1256 being so poled as to make the grid of tube 1257 positive. However, the plate circuit of 1257, which includes the transformer 1258, includes a battery 1259 with the negative terminal toward the plate so that the positive potential on the grid is not able alone to produce a current through the plate circuit and therefore no charge is placed on condenser 1254. This is the condition which exists in case of an "off" pulse in which event no corresponding pulse passes through the primary of transformer 1258. It will be recalled that the "off" signal corresponded to the introduction at the transmitter of attenuator $A_1$ and it is noted that corresponding thereto such attenuation is not introduced at the receiver. In case of an "on" signal there will be a pulse in the secondary of transformer 1258 which is so poled as to give a positive potential to the plate 1257. This pulse alone is not sufficient to cause the current to flow through the tube because of bias on the grid. If however, there is received simultaneously a pulse from the pulse generator rendering the grid positive then there will be a flow of current charging the upper plate of condenser 1254 positively and so closing the loop of attenuator $A_1$ and introducing the corresponding attenuation. The charge on condenser 1254 will persist until the time of the next M pulse [whereon] *where-upon* the condenser will be discharged as heretofore noted.

Thus it is seen that attenuator $A_1$ will not be introduced if the corresponding attenuator $A_1$ has been introduced at the transmitting station. If it has not been introduced at the transmitting station, it will be introduced and remain in at the receiving end. Precisely the same operation will take place for each attenuator $A_1 \ldots A_n$ after which the combination of attenuators connected in the circuit will be the complement of that at the transmitting end. Thus, whatever attenuation is introduced at the transmitter it will be omitted at the receiver and the reverse.

Local oscillator X

The receiving station is provided with a local oscillator X shown in Fig. 11 as 1120. This may, but need not be of the same frequency as the local oscillator II at the transmitting station. In other words no synchronism between the two oscillators is required.

Phase shifter IX

The phase shifter IX is shown as comprising two triodes 1221 and 1222 the grid circuits of which are supplied in parallel from the local oscillator 1120 through the transformer 1223. The output circuit comprises transformer 1224 the mid-point of the primary of which is connected to the positive *terminal* of the battery. The grid circuit of tube 1221 contains the condenser 1225 and the grid circuit of tube 1222 includes the battery 1226 which tends to give a positive bias to the grid. Normally, therefore, the transconductance of tube 1222 will be higher than that of 1221 and there will be an alternating current of local oscillator frequency in the secondary of 1224 of one phase. The phase of the current in the secondary [current] *circuit* may however be reversed by means of the phase shifter.

This phase shifter comprises two diodes 1231 and 1232 biased so that normally they are nonconducting. When a pulse from the tube 1326, corresponding to *the* P pulse, arrives at transformer 1233 it is so poled as to render diode 1231 conducting, giving a positive charge to condenser 1225 of such magnitude as to give tube 1221 a higher transconductance than tube 1222, whereupon the current in the secondary of 1224 is reversed in phase. The reversal occurs if the polarity pulse of the code at the transmitter was an "off" signal, meaning an absence of a received pulse. The condenser 1225 is so connected as to retain its charge for the duration of one complete cycle.

If, the polarity of the sample of the complex wave at the transmitter had been negative then an "on" P polarity pulse will have been transmitted and, in turn, received at the receiving station. A corresponding pulse, therefore, arrives at the transformer 1234 in parallel with the transformers 1258, etc., at each of the attenuation control circuits. The transformer 1234 is so poled that its pulse opposes [that of] the pulse coming on transformer 1233 and consequently diode 1231 does not conduct, the condenser 1225 does not become charged and the phase of the oscillations in secondary of 1224 is not reversed. At the end of the cycle, or the beginning of the next cycle, the M pulse from the tube 1325 operates through transformer 1236 to make diode 1232 conducting whereupon the condenser 1225 is discharged or "reset" to normal condition. Through the means thus described it is seen that it is possible to change the phase of the local oscillator current in transformer 1224 by 180 degrees.

The output of 1224 of local oscillator frequency is impressed on the input circuit 1140 of the first attenuator tube 1145. In the output circuit of the last attenuator tube 1185 there is included the resistance 1216 corresponding to R of Fig. 2. This resistance is large compared to the resistance $R_n$ of the last attenuator and consequently adds no appreciable attenuation. Thus it is seen that the amplitude of the current in 1216 and the potential variations across its terminals, as well as the current in the transformer 1214, will be proportional to the sum of the attenuations which have not been introduced at the receiver. Consequently, they will be proportional to the sum of the attenuations which were introduced at the transmitter and therefore proportional to the amplitude of the complex wave sample. Furthermore, [its] *their* phase will be determined by phase shifter IX to correspond with the polarity of the complex wave sample.

Homodyne detector XI

The homodyne detector XI includes a balanced demodulator comprising the varistors 1211 and 1212 connected in a standard bridge circuit. This demodulator is supplied directly with local oscillator frequency through transformer 1213 and also with the same frequency through tube 1215 and transformer 1214. There will then appear over the resistor 1217 potential differences of sampling frequency, each element being proportional in every respect to the sampling current or voltage at the transmitter. If the polarity of the sampling current at the transmitter reverses, then the voltage across the resistor 1217 will also reverse.

The last step of interpretation may come through the multigrid tube 1218. This tube is normally biased to cut-off. However, through the additional section of the timestick leading to the pulse n′, previously referred to, a positive pulse is impressed on the triodes 1351 and 1352 connected in series to give requisite amplification without change of polarity of the pulse. Very shortly after the termination of the amplitude code there arrives then on one grid of tube 1218 a positive pulse of sufficient value to enable the tube 1218 for the duration of the pulse n′. During this interval then there appears in the output circuit of 1218 a pulse determined by the magnitude and polarity of the voltage over 1216, which latter is proportional to the amplitude and polarity of the complex wave sample.

These pulses will arrive in succession, one for each sample from the complex wave. By means of the low-pass filter 1219 the undesired high frequency components may be removed and the resulting wave, passing to terminal equipment and receiver, will be a reproduction of high fidelity of the original complex wave at the transmitting station.

During the setting up of the attenuations, pulses modulated on a suitable carrier will have been transmitted from VII bearing the information to the remote station on what attenuations are being introduced. The amplitude of each of the pulses so transmitted from VII will be the same and each element of the signal is purely an "off" and "on" matter. Since only integers are sent such a signal can be repeated without added distortion or noise [to] *in* the recovered intelligence even though distortion or noise below a certain threshold level may be present in the repeaters. Thus, even for very high quality transmission the requirements on the repeaters are very low. This makes possible transmission over long paths with frequent repeating. The presence or introduction of noise in the transmission path from VII to the remote receiving station will have no influence so long as the noise introduced is relatively small compared with the signal being transmitted over the path. Such noise therefore will not appear in the signal later reproduced.

This application is related to my copending application Ser. No. 603,989, filed July 9, 1945, Patent 2,508,622 of May 28, 1950, and differs from it in the manner of building up attenuation. Whereas in that application the conductance steps are additive on a unit or multiunit basis, in this application the changes are on a decibel basis, that is, the attenuations herein are in successive steps of multiples. This has certain advantages one of which is the much wider range of amplitude which can be covered by a code of a given number of units. Thus in my above-identified application for a code of n digits the range of selection of amplitude in voltage (or current) is $2^n$ whereas in this system the range of selection of amplitude in decibels in $2^n$. If $n=7$ and if the reference level is taken as $e_0$ (perhaps in millivolts), then for the copending application the range of amplitude is from $e_0$ to $2^7 e_0$ ($=128\ e_0$, equivalent to 42 decibels). This means a granularity of $e_0$ in a maximum contemplated signal of $128\ e_0$; that is, an accuracy within 1 per cent. However, the granularity is still $e_0$ no matter how small the input, and so for an input as low as $2\ e_0$ the accuracy is about 50 per cent. In the system of this application the percentage accuracy of reproduction will be the same without regard to the amplitude of the output. Thus, if the smallest step is .5 decibel, then the error in determining the value of input voltage will not be greater than 6 per cent and will average about half of this. Furthermore, for a seven-digit system the range in amplitude will be from $$e_0 \times 10^{\frac{63.5}{20}}$$

(that is, about 1 to 1500). This feature of a non-linear scale (where the electrical quantity built up is not proportional to the voltage or current amplitude of the sample) is equivalent to a type of volume compression in the coded signal and this is an essential aspect of this invention. The particular non-linearity which has been used for illustration is a decibel scale (the electrical quantity built up is proportional to the logarithm of the voltage or current amplitude of the sample) and this, as pointed out above, not only gives wider range but gives smaller granularity for low amplitude samples.

In considering the above system it will be apparent to those skilled in the art that many variations may be made in the system thus far described without departing from the spirit of the invention. For example, the attenuation scheme, which constitutes an important element in my invention, may be materially altered as indicated in Fig. 14. There the plurality of resistance combinations $R_1$ and $R_1'$, $R_2$ and $R_2'$, etc. is shown as a series of potentiometers connected in tandem. The portion $R_1'$, $R_2'$ . . . $R_n'$ of each potentiometer is capable of virtual short circuit as already indicated. The portion $R_1$, $R_2$, etc., of the resistances will have to be large compared with the electrically controlled shunt portions if the attenuations caused in the various potentiometers are to be substantially independent. This may be somewhat difficult to attain and for this reason isolation of the electrically controlled resistances by means of vacuum tubes, as already described in detail, may be desirable.

Other changes may be permissible, some of these having been already mentioned. For example, the T channel of pulses may be omitted with corresponding simplifications although with some loss of control. Also, the local oscillator at the receiving station may be on all the time instead of being triggered on occasionally, for even if on, it is ineffective at the terminal apparatus unless and until the tube 1218 has been enabled by the pulse coming from n′ supply. Still further, it will be evident that modulation and demodulation features of the transmitter station may be omitted, the sample signals of the tube 820 going directly to the input of tube 835 and directly from tube 901 to the resistor 907, or its equivalent, without the intermediation of the demodulator in the homodyne unit IV. This would mean also the omission of the local oscillator. Corresponding alterations could be made at the receiving station in connection with its local oscillator. In general, however, such omissions or simplifications will lead to sacrifice in operation or quality and it will be a matter of engineering judgement as to how far one may carry out such simplifications.

What is claimed is:

1. The method of transmitting information on the shape of a complex signal wave which comprises taking amplitude samples of the wave at equally spaced intervals, building up an attenuation network for each sample step by step to a magnitude proportional to the sample amplitude and transmitting "off" or "on" pulses in accordance with each step, the steps being related to each other on a non-linear basis.

2. The method of transmitting information on the shape of a complex signal wave which comprises taking amplitude samples of the wave at equally spaced intervals building up an attenuation network for each sample step by step to a magnitude proportional to the sample amplitude and transmitting "off" or "on" pulses in accordance with each step, the steps being related to each other on a logarithmic basis, the total attenuation on said basis being equal to the sum of the attenuations for the individual steps introduced.

3. The method of claim 1 with the added step of introducing at a receiver an analogous attenuation network, the total steps of attenuation there introduced being the complement of those introduced at the transmitting station.

4. A system for transmitting information on the shape of a signal wave comprising a circuit for periodically sampling the amplitude of the wave, means for building up an attenuation network by a series of non-linearly related steps to a value proportional to each sample, means for generating a cycle of pulses for each sampling operation, means responsive to the first pulse of the cycle for controlling the sampling circuit and means responsive to succeeding pulses of the cycle for controlling said means for building up an electrical quantity in coordination with the respective sample.

5. A system for transmitting information on the shape of a signal from a transmitting to a receiving station, the transmitting station comprising means for sampling a signal wave periodically and storing on a condenser a potential proportional to the sample amplitude, an amplifier tube the input of which is connected across the storage condenser, means for connecting in the circuit of said tube a multiple attenuator comprising a plurality of attenuators in tandem to attenuate the effective output voltage, a pulse generator means controlled to build up the said attenuation step by step by the coordination of the signal amplitude with pulses from the pulse generator until the residual effective output falls to an arbitrary low reference level.

6. A system for transmitting information on the shape of a signal from a transmitting to a receiving station, the transmitting station comprising means for sampling a signal wave periodically and storing on a condenser a potential proportional to the sample amplitude, a constant current source producing a current proportional to the charge on the storage condenser for the duration of the sampling period, a train of unilateral attenuating devices operating to attenuate the current, a control circuit for each attenuator, each attenuator adapted to introduce or not introduce its attenuation subject to the control circuits, the control circuits being operated successively by pulses from a pulse generator and introducing attenuation if the residual of the sample amplitude is in excess of an arbitrary small amount.

7. The combination of claim 6 characterized by the fact that the train of unilateral attenuating devices comprises a series of amplifier tubes connected in tandem, the coupling circuit from the output of one tube to the input of the next including a coupling resistance a portion of which may be substantially short-circuited to introduce a designated amount of attenuation, the introduction of said attenuation being subject to the control circuits.

8. The combination of claim 6 characterized by the fact that the train of unilateral attenuating devices comprises a series of amplifier tubes connected in tandem, the coupling circuit from the output of one tube to the input of the next including a coupling resistance a portion of which may be substantially short-circuited to introduce a designated amount of attenuation, the introduction of said attenuation being subject to the control circuits in such manner that if the residual of the sample amplitude at any stage is in excess of an arbitrary small amount, the next step of attenuation is introduced and if below said arbitrary amount, it will be first introduced and then removed.

9. A system for transmitting information on the shape of a signal wave comprising a circuit for periodically sampling the amplitude of the wave, means for building up an electrical quantity by a series of steps related on a logarithmic basis to a value proportional to the signal amplitude, means for testing the polarity of the sample, and means for generating for each sampling operation a cycle of pulses, means responsive to the first pulse of said cycle for controlling the sampling circuit, means responsive to the second pulse of said cycle for controlling the means for testing the polarity of the sample, and means responsive to succeeding pulses of said cycle in coordination with the sample for controlling said means for building up an electrical quantity.

10. Apparatus for transmitting a complex wave form comprising means for setting up a series of groups of permutatively coded signaling pulses, the series representing a succession of instantaneous amplitude samples of the wave form and each pulse of a group representing a different fraction of the amplitude of a wave form sample, the means therefor comprising a plurality of attenuators adapted to be connected in tandem, each element of attenuation being proportional to a fraction of the corresponding sample amplitude and the sum of the attenuations introduced being proportional to the instantaneous amplitude of the wave form.

11. Apparatus for reconstructing a complex wave form from a series of groups of permutatively coded signaling pulses, the series representing a succession of instantaneous amplitude samples of the complex wave form, each pulse of a group representing a different fraction of the amplitude of said wave form sample, the means therefor comprising a plurality of attenuators to be introduced in tandem, the total attenuation being proportional to the sum of the individual attenuations, this sum subtracted from a constant being proportional to the instantaneous amplitude of the complex wave sample.

12. A system for transmitting information on the shape of a signal wave from a transmitter to a receiver station, the transmitter station comprising a circuit for periodically sampling the amplitude of the wave, a current source adapted to deliver a current proportional to the sample amplitude and constant for the duration of a sampling interval a load supplied with current from said source, a circuit for transferring the effective voltage across the load to a polarity and amplitude detecting circuit, a plurality of n attenuators to be connected in tandem in the load circuit of said current generator and thus reducing the voltage reaching the polarity and amplitude detector, a control circuit for each attenuator; a pulse generator adapted to generate cycles of pulses, one pulse in the cycle serving as a marker pulse and as timing the sampling of the signal wave, another serving as a polarity pulse to cooperate in testing the polarity of the sample amplitude, the remaining pulses operating successively through the control circuits of the attenuators in cooperation with the residual amplitude reaching the amplifier detector to introduce one or more of the attenuators and thus to reduce the residual reaching the amplitude detector to an arbitrary small value, a circuit associated with each control circuit to transmit an "off" signal if its attenuator is left in and an "on" signal if it is removed, the n attenuators being graded in size from the smallest of value $A_0$, the largest being first tested for introduction, the system so operating that the total attenuation on a decibel basis introduced and left in at the end of the cycle is proportional to the sample amplitude.

13. A system for transmitting information on the shape of a signal wave from a transmitting to a receiving station, the transmitting station comprising a circuit for periodically sampling the amplitude of the wave and storing a charge on a condenser proportional to the amplitude, a constant current source controlled by the condenser charge and adapted to deliver a current proportional to the condenser charge and constant for the duration of a sampling interval, a circuit for transferring the voltage across the load to a polarity and amplitude detecting circuit, a plurality of n attenuators to be connected in tandem in the load circuit of the current generator to reduce the voltage reaching the polarity and amplitude detector, a control circuit for each attenuator, a pulse generator adapted to generate cycles of pulses each pulse consisting of 2+n equally spaced pulses the first pulse in the cycle serving as a marker pulse and as timing the sampling of the signal wave, the second serving as a polarity pulse for timing the operation of the detector to test the polarity of the condenser charge, the next pulse operating through the control circuit of the first and largest attenuator with the signal amplitude reaching the amplitude detector to introduce the said first attenuation and to leave it in if the residual then reaching the amplitude detector is above an arbitrary small value and next to remove it if the residual is less than this small value; a circuit associated with the control circuit to transmit an "off" signal if the attenuator is left in and an "on" signal if it is removed, each succeeding pulse in coordination with the residual then reaching the amplitude detector operating in turn in the same manner through the control circuit to introduce, and then remove if necessary, its attenuator and to transmit corresponding signals, the n attenuators being graded in size from the smallest of value $A_0$ to the largest of value $2^{n-1} A_0$ the total attenuation introduced and left in at the end of a cycle being proportional on a decibel basis to the sample amplitude, the size of the steps increasing in accordance with a binary counting system.

14. In a communication system, apparatus for sampling a signalling wave at regular occurring instants of time, a source of high frequency alternating current, means for maintaining the magnitude of said alternating current between said instants of time at a value determined by the magnitude of said signaling wave at the last instant of the sample, a source of reference voltage, apparatus for comparing a fraction of said alternating current with said reference voltage, equipment for sending either one of two signaling conditions, and apparatus responsive to said comparison apparatus for controlling which of said two signaling conditions are transmitted incident to said comparison.

15. In a communication system, apparatus for sampling a signaling wave at regular occurring instants of time, a source of high frequency alternating current, means for maintaining the magnitude of said alternating current between said instants of time at a value determined by the magnitude of said signaling wave at the last instant of the sample, a source of reference voltage, apparatus for comparing a fraction of said alternating current with said reference voltage, equipment for sending either one of two signaling conditions and apparatus responsive to said comparison apparatus for controlling which of said two signaling conditions are transmitted incident to said comparison, and equipment for thereafter changing the fraction of said alternating current and repeating the process of comparison and signal transmission.

16. A signal transmission system comprising a source of electrical current, a source of reference voltage, switching equipment for comparing a fraction of said current with said reference voltage, and signal transmitting equipment for transmitting a signal condition of a nature controlled by said comparison.

17. A signal transmission system comprising a source of electrical current, a source of reference voltage, apparatus for comparing a fraction of said current with said reference voltage, signal transmitting apparatus for transmitting a signal condition of a nature determined by said comparison, and other apparatus for comparing a fraction of said fraction of current with said reference voltage and means for transmitting a signal condition of a nature controlled by said second comparison.

18. A signal transmission system comprising a source of electrical current, a source of reference voltage, apparatus for comparing a fraction of said current with said reference voltage, signal transmitting apparatus for transmitting a signal condition of a nature controlled by said comparison, other apparatus for comparing a fraction of said fraction of current with said reference voltage and transmitting a signal of a nature controlled by said second comparison, apparatus operative instant to transmission of any of said signals for controlling the fraction of said current to be compared with said reference voltage at a subsequent comparison.

19. A signal transmitting system, comprising a source of alternating current, a source of reference voltage, means including switching equipment for causing successively smaller fractions of said current to be compared with said reference voltage, and signal transmitting equipment for transmitting a plurality of signals the character of each of which is determined by each successive comparison.

20. A signal transmission system, comprising a source of current, a source of reference voltage, means including switching equipment for causing successive fractions of said current to be compared with said reference voltage or reference level, and fractionating means for causing each of said successive fractions to be a product of one or more of certain of said previous fractions and an additional fraction.

21. In a signaling system, a source of signal voltage which may have a plurality of different magnitudes, equipment for determining the amplitude thereof and transmitting a series of pulses representing said amplitude comprising means for establishing a reference voltage, a measuring circuit for comparing an input thereto with said reference voltage, a plurality of attenuators of different attenuation, switching equipment for connecting said attenuators in sequence and in tandem between said source of signal voltage and said measuring device in the order of their decreasing attenuation, and signal transmitting equipment for transmitting a signaling condition incident to the connection of each of said attenuators between said current source and said measuring equipment.

22. In a communication system means for successively sampling the signal to obtain an indication of the signal amplitude at the time of sampling, means for measuring said indication at successive instants in terms of units of respectively different magnitudes, and means for producing and transmitting a pulse at each of such successive instants and of one of two different signaling conditions controlled by said means for measuring.

23. In a communication system means for periodically sampling the message wave, means for establishing a current proportional to each sample amplitude, a measuring circuit operating to compare the input thereto with a predetermined reference level, a plurality of loss networks adapted to be connected in circuit between said means for establishing a current and said measuring circuit, means for successively connecting said networks between said means for establishing a current and said measuring circuit, means controlled by said measuring circuit for maintaining each of said networks in circuit when the input to said measuring circuit exceeds said reference level upon the connecting of the respective said network and for taking the respective said network out of circuit when the input to said measuring circuit is below said reference level, and means for establishing a series of signal pulses one corresponding to each of said networks and each of one signaling condition when the respective network is maintained in circuit and of another signaling condition when the respective network is taken out of circuit.

24. A combination according to claim 23 in which said loss networks are attenuation networks and said means for successively connecting said networks between said means for establishing a current on said measuring circuit operates to connect said attenuation networks in tandem.

25. In the method of signal transmission in which the message wave is periodically sampled and for each sample there is transmitted a group of pulses each of one of two different signaling conditions, each representing in one of said conditions the presence in the respective sample of a corresponding constituent amplitude range of the maximum amplitude capacity of the system, and in the other of said conditions the absence of the corresponding constitutent amplitude range, the steps of, measuring each sample in terms of one of the constituent amplitude ranges, when the sample exceeds said constituent amplitude range producing a pulse of said one signaling condition and measuring the excess of said sample over said constituent amplitude range in terms of a second constituent amplitude range, when said sample is less than said first constituent amplitude range producing a pulse of said other signaling condition and measuring the sample in terms of said second constituent amplitude range, and repeating the process of measurement and production of pulses for each additional constituent amplitude range.

26. In a signal transmission system, a source of alternating current, a source of reference voltage, pulse transmission means for transmitting pulses of at least two different characteristics, equipment for comparing a fraction of said current with said reference voltage, and controlled means for causing the transmission of a pulse of one characteristic by said pulse transmission means when said fraction exceeds said reference voltage.

27. In a signal transmission system, a source of alternating current, a source of reference voltage, pulse transmission means for transmitting pulses of at least two different characteristics, equipment for comparing a fraction of said current with said reference voltage, and means controlled by the comparison equipment for causing the transmission of a pulse of one characteristic by said pulse transmission means when said reference voltage exceeds said fraction.

*28. An electronic system for converting an amplitude modulated signal into binary code pulse indications, comprising a source for providing pulses modulated from a given maximum amplitude in accordance with the respective instantaneous amplitude of an amplitude modulated audio signal, means for providing a reference voltage having an initial value which is a given fraction of said given maximum amplitude,*

*means for periodically comparing a given number of times for each amplitude modulated pulse the relative amplitude of the voltage proportional to said reference and to each of said amplitude modulated pulses, means for periodically controlling the application of said reference and said pulse voltages to said comparing means, means for substantially equalizing in said comparing means said reference voltage and said pulse voltage in controlled periodical steps, means for producing a pulse code modulation in response to the relative amplitude of said voltages for each of said periodical steps, and means for controlling the character of the equalization of said voltages for each step in accordance with the relative amplitude of said voltages during the preceding step.*

*29. A system according to claim 28 wherein said character controlling means includes differential amplifier and quantizer circuits for obtaining a given number of pulse code indications having pulses and vacant portions in accordance with the relative amplitude of said reference and signal pulse voltages for each of said comparison steps.*

*30. A system according to claim 28, further including means operative after said number of amplitude comparisons to provide a controlling*

*voltage for rendering inoperative said application controlling means.*

JOHN R. PIERCE.

REFERENCES CITED

The following references are of record in the file of this patent or the original patent:

UNITED STATES PATENTS

| Number | Name | Date |
|---|---|---|
| 2,146,876 | Zworykin | Feb. 14, 1939 |
| 2,199,634 | Koch | May 7, 1940 |
| 2,262,838 | Deloraine et al. | Nov. 18, 1941 |
| 2,272,070 | Reeves | Feb. 3, 1941 |
| 2,313,209 | Valensi | Mar. 9, 1943 |
| 2,324,314 | Michel | July 13, 1943 |
| 2,403,561 | Smith | July 9, 1946 |
| 2,404,919 | Overbeck | July 30, 1946 |
| 2,408,077 | Labin | Sept. 24, 1946 |
| 2,413,023 | Young, Jr. | Dec. 24, 1946 |
| 2,416,330 | Labin et al. | Feb. 25, 1947 |
| 2,419,340 | Easton | Apr. 22, 1947 |
| 2,430,139 | Peterson | Nov. 4, 1947 |

FOREIGN PATENTS

| Number | Country | Date |
|---|---|---|
| 647,468 | Germany | July 5, 1937 |